US006406197B1

(12) United States Patent
Okuda et al.

(10) Patent No.: US 6,406,197 B1
(45) Date of Patent: Jun. 18, 2002

(54) OPTICAL FIBER COUPLER, A PROCESS FOR FABRICATING THE SAME AND AN OPTICAL AMPLIFIER USING THE SAME

(75) Inventors: Michitaka Okuda; Hiromi Ajima; Yusuke Takei; Hiroshi Fujimoto, all of Yokohama; Kazuyuki Miyake, Chiyoda-ku; Tatsuhiro Kawamura; Yasuhide Sudo, both of Itami, all of (JP)

(73) Assignees: Kyocera Corporation, Kyoto; Mitsubishi Cable Industries, Ltd., Amagasaki, both of (JP)

( * ) Notice: Subject to any disclaimer, the term of this patent is extended or adjusted under 35 U.S.C. 154(b) by 0 days.

(21) Appl. No.: 09/579,785

(22) Filed: May 26, 2000

(30) Foreign Application Priority Data

May 27, 1999 (JP) .......................................... 11-148052

(51) Int. Cl.[7] ............................................... G02B 6/255

(52) U.S. Cl. ......................................... 385/96; 359/341

(58) Field of Search ......................... 385/96–99, 41–45; 359/341

(56) References Cited

U.S. PATENT DOCUMENTS 4,392,712 A 7/1983 Ozeki
5,171,345 A * 12/1992 Takemura ................. 385/96 X
5,408,555 A * 4/1995 Fielding et al. ............... 385/43
5,802,224 A 9/1998 Okuda
6,169,832 B1 * 1/2001 McLandrich ................. 385/43
6,208,457 B1 * 3/2001 Okuta et al. ................ 359/341

* cited by examiner

*Primary Examiner*—Brian Sircus
*Assistant Examiner*—Son V. Nguyen
(74) *Attorney, Agent, or Firm*—Hogan & Hartson, L.L.P.

(57) ABSTRACT

An optical fiber coupler for optical fiber amplifier use in the field of optical communications is provided. The optical fiber coupler comprises: a rare earth-doped fiber as an optical amplifying element; a quasi rare earth-doped fiber for entrance of input signal light; a fused-stretch fiber portion as a multiplexing element which connects a part of the rare earth-doped fiber and a parts the quasi rare earth-doped fiber, wherein the fused-stretch fiber portion formed by stretched a fused mixture of parts of the rare earth-doped fiber and the quasi rare earth-doped fiber; and a single mode fiber which is jointed at a fused joint portion to another shortened rare earth-doped fiber connected to the fused-stretch fiber portion on a side connected by the quasi rare earth-doped fiber. The quasi rare earth-doped fiber has substantially equal propagation constant to the rare earth-doped fiber without substantially containing rare earth elements. The optical fiber coupler is fabricated by the steps of jointing a single mode fiber with a rare earth-doped fiber by fusing abutted end faces of both fibers to form a combined fiber; and fusing parallel contact parts of a quasi rare earth-doped fiber and of the rare earth-doped fiber of the combined fiber and then elongating the fused parts in a desired diameter to form a fused-stretch fiber portion.

7 Claims, 4 Drawing Sheets

1 1a 3 4
2
1a 4
1 2

OPTICAL FIBER COUPLER, A PROCESS FOR FABRICATING THE SAME AND AN OPTICAL AMPLIFIER USING THE SAME

BACKGROUND OF THE INVENTION

1. Field of the Invention

The invention relates to an optical fiber coupler for optical amplifier use in the field of optical communications, a process for fabricating the optical fiber coupler and an optical fiber amplifier using the same.

2. Prior Art

In the field of optical communication systems, optical fiber amplifiers have been developed to directly amplify laser beam signals.

An optical fiber amplifier utilize an principal that a rare earth doped fiber amplifies a signal laser during the population inversion of rare earth ions dispersed in the fibers which is pumped up by pumping light which is introduced the fiber. In such an optical fiber amplifier, a optical fiber coupler has been used to introduce the signal light and the pumping light. U.S. Pat. No. 5,802,224 by M. Okuta et al. discloses an optical coupler in which two optical fibers are connected partially on the sides of the fibers to form a fusion-welded and extended portion. The above U.S. Patent discloses use of two optical couplers which is connected by a rare earth-doped fiber to apply to an optical fiber amplifier in which said portion is used to mix signal light passing though one of the two fibers with pumping light passing through the other fiber from the pumping light laser source. The mixed light in the fusion-welded and extended portion is extracted from either of fibers at the opposite end of the portion to the said signal entering fibers and transmitted to the rare earth doped fiber to amplify the mixed light.

Such a optical coupler has been known, for example, in U.S. Pat. No. 5,802,224 by T. Ozeki which discloses a light distributor comprising a plurality of optical fibers having a tapered portion which is formed by thermally fused together to form a light mixing portion where the cores of the fibers are packed close to each other in a single cladding.

A conventional structure of the optical fiber amplifier is shown in FIG. 7, including a multiplexer 7 and a rare earth-doped optical fiber 4 doped with rare earth metal such as Er or Nd in the fiber core, which is connected to the multiplexer, a pumping light source 6 connected to the multiplexer 7, and a fiber for entrance of a laser signal to the multiplexer 7. The rare earth-doped optical fiber 4 functions as a laser beam amplifying element, and is connected to a passive device for preventing laser oscillation and outputting the amplified signal, such as inline optical isolator 8. In operation, input signal light is multiplexed with pumping light in the multiplexer and amplified during transmit through the rare earth-doped fiber to output the increased signal light.

Conventionally, the multiplexer 7 has been formed of a single mode fiber and, in fabricating an amplifier, must have been connected to the components including the rare earth-doped fiber and the pumping light source. Such a structure have needed labor to connect between the optical fibers from the optical components by fusion of ends of the fibers and have had light connection loss at such connection portions between the fibers, resulting in undesirable amplification characteristics including low signal gain and noise figure properties.

In the example as shown in FIG. 7, there have been required three splicing portions 9 between multiplexer 7 and pumping light source 6, multiplexer 7 and rare earth-doped optical fiber 4, and said fiber 4 and isolator 8. These splicing portions not only have reduced light energy therethrough, but also have required spaces in which to be placed in packing an optical circuit, then increasing a packing volume for the amplifier.

Further, in the conventional amplifier structure shown in FIG. 7, the input signal light and pumping light are multiplexed in the multiplexer and thereafter entered into the rare earth-doped fiber. Since the signal light and pumping light have different mode field diameters, it has been difficult to adapt and communicate both multiplexed components of the signal light and the pumping light in optimum conditions at the splicing portion.

SUMMARY OF THE INVENTION

An object of the invention is to provide an optical fiber coupler being capable of being connected with a rare earth-doped fiber as an optical amplifying element directly without using splicing portions for fabricating an optical amplifier.

Another object of the invention is to provide an optical fiber coupler suitable for reducing connecting loss of light energy at each of fiber joint portions to constitute an optical amplifier.

Further another object of the invention is to provide an optical fiber coupler to eliminate the need for adjusting mode field diameters between signal light and pumping light transmitting through a rare earth-doped fiber.

Further another object of the invention is to provide a process for fabricating an optical fiber coupler by directly jointing optical fibers without using splicing portions.

Further another object of the invention is to provide an optical amplifier capable of being fabricated without using any splicing portions.

Further still another object of the invention is to provide an optical amplifier to reduce connecting loss of light energy at fiber joint portions to constitute an optical amplifier.

In the invention, an optical fiber coupler is provided wherein a rare earth-doped fiber is jointed with a fused-stretch fiber portion as a multiplexing element that is formed of a quasi rare earth-doped fiber with the rare earth-doped fiber by fusing and elongating both fibers.

Particularly, the optical fiber coupler of the invention comprises: a rare earth-doped fiber; a quasi rare earth-doped fiber; a fused-stretch fiber portion as a multiplexing element which connects a part of the rare earth-doped fiber with a part of the quasi rare earth-doped fiber; and a single mode fiber which is connected via a shortened side of the rare earth-doped fiber connected to the fused-stretch fiber portion.

In the optical fiber coupler, the fused-stretch fiber portion is formed by stretching the fused portion of paralleled parts of the rare earth-doped fiber and the quasi rare earth-doped fiber.

Particularly, in the invention, a quasi rare earth-doped fiber is defined as a fiber having a substantially equal propagation constant to the rare earth-doped fiber without substantially containing rare earth elements.

Particularly, the joint portion of the single mode fiber to the may be set to being in shortened distance from the fused-stretch fiber portion, then lowering light loss during passing through the shortened rare earth-doped fiber.

By the present invention, a process of fabricating an optical fiber coupler is provided, which comprises: jointing a single mode fiber with a rare earth-doped fiber by fusing abutted end faces of both fibers to form a combined fiber; and fusing parallel contact parts of a quasi rare earth-doped fiber and of the rare earth-doped fiber of the combined fiber and then elongating the fused parts in a desired diameter to form a fused-stretch fiber portion.

Also, the above optical fiber coupler may be applied to optical fiber amplifiers. In the amplifier of the invention, signal light enters the single mode fiber, pumping light enters the quasi rare earth-doped fiber to multiplexes with the signal light, and an amplified light is output from the rare earth-doped fiber.

In the optical amplifier, preferably, a pumping light source may be directly connected to the quasi rare earth-doped fiber.

In the invention, an optical amplifier is provided using two optical fiber couplers, wherein the common rare earth-doped fiber has the two optical fiber couplers, signal light enters the single mode fiber of one of the optical fiber couplers and pumping light from two pumping light sources enters both quasi rare earth-doped fibers of the optical fiber couplers, and an amplified light is extracted from the single mode fiber of the other optical fiber coupler.

BRIEF DESCRIPTION OF THE DRAWINGS

The optical fiber coupler of the invention is described in further detail referring to the accompanying drawings below, in which.

DETAILED DESCRIPTION OF THE INVENTION

Figure 1A:
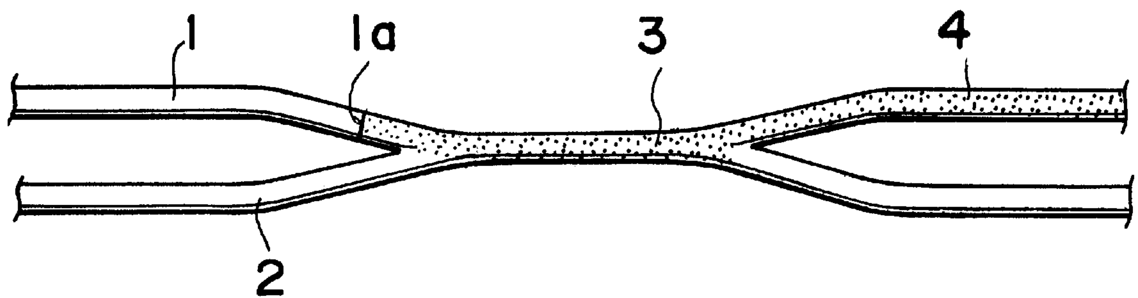
FIG. 1A shows a optical fiber coupler according to an embodiment of the invention.

In the invention, an optical fiber coupler, as shown in FIG. 1A, includes a rare earth-doped fiber 4 and a quasi rare earth-doped fiber 2 which are partially jointed with each other at a fused-stretch fiber portion 3, which is used as a multiplexer, and a single mode fiber 1 which is jointed to a shortened side of the rare earth-doped fiber 4 at a fused joint portion 1*a* in the vicinity of the fused-stretch fiber portion.

The quasi rare earth-doped fiber 2 means a fiber undoped with a rare earth element which has a propagation constant substantially equal to that of the rare earth-doped fiber 4.

For example, the rare earth-doped fiber usually has a rare earth-doped core having a higher refractive index and a smaller diameter to reduce the mode field diameter to about 8 μm, as compared with the single mode fiber whose core may be approximately 10 μm. The quasi rare earth-doped fiber may preferably be prepared to have the same mode field diameter as the rare earth-doped fiber. Therefore, the quasi rare earth-doped fiber may have a substantially identical core in size and optical conditions to that of the rare earth-doped fiber, but not containing any rare earth element in the core.

The fused-stretch fiber portion 3 may be formed by fusing thermally and connecting parallel parts of both rare earth-doped fiber 4 and quasi rare earth-doped fiber 2 and then stretching the fused parts in smaller, controlled core diameters. Thus, each end of the fused-stretch fiber portion 3 may be connected with both rare earth-doped fiber 4 and quasi rare earth-doped fiber 2, and a single mode fiber 1 is jointed to one end of the rare earth-doped fiber 4 at the fused portion 1*a* adjacent the end of the fused-stretch fiber portion 3.

Figure 1B:
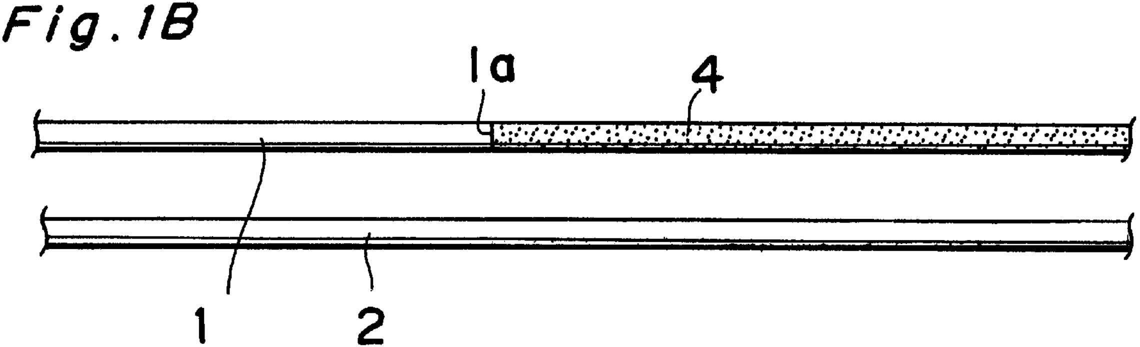
FIG. 1B shows a set of optical fibers used to fabricate a optical fiber coupler according to an embodiment of the invention.

The optical fiber coupler may be fabricated as follows. First, a rare earth-doped fiber 4 is jointed to a single mode fiber 1 at a fused joint portion 1*a* by fusing abutted end faces of both fibers 2 and 4 as shown in FIG. 1B.

Second, after a quasi rare earth-doped fiber 2 makes parallel contact to the rare earth-doped fiber 4 of the above jointed fiber, then the contact portion of these fibers 2 and 4 is fused and stretched over some distance to form a fused-stretch fiber portion 3.

Figure 2:
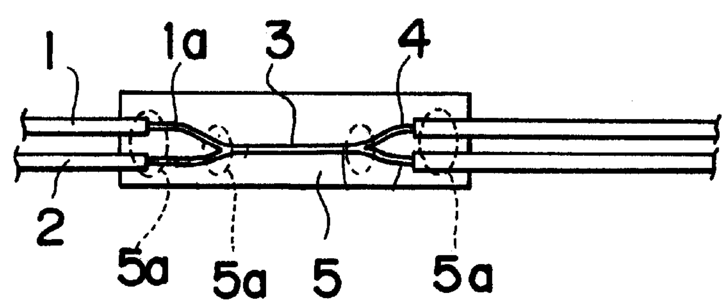
FIG. 2 shows an optical fiber coupler mounted in a substrate according to an embodiment of the invention.

Finally, after fusing and stretching, as shown in FIG. 2, the optical fiber assembly is amounted on a substrate 5 and fixed thereto with an adhesive 5*a* to packing an optical fiber coupler.

As described above, the quasi rare earth-doped is substantially equal in propagation constant to the rare earth-doped fiber so that both fibers are capable of complete coupling of the specific wavelength light. Namely, a suitable heat treatment for stretching the fused-stretch fiber portion 3 may be performed such that light having wavelength range from the pumping light source can be sufficiently coupled between the quasi rare earth-doped fiber 2 and the rare earth-doped fiber 4 in the fused-stretch fiber portion 3, this allowing this optical fiber coupler to function as a multiplexer to multiplex a input signal light and the pumping light.

In this embodiment, the fused joint portion 1*a* is maintained in a suitably short distance of the rare earth-doped fiber 4 from the fused-stretch fiber portion 3. This distance between the fused joint portion 1*a* and the fused-stretch fiber portion 3 may preferably be 30 mm or less because the distance exceeding 30 mm causes input light energy to be absorbed by doped rare earth ions during passing through the rare earth-doped fiber 4 until the input signal light reaches the fused-stretch fiber portion 3 to couple with the pumping light. Another reason for the limited distance is that excessive distance requires an enlarged substrate or casing for mounting or containing the optical fiber coupler.

The optical fiber coupler may be applied to an optical amplifier in which input signal light is entered into the single mode fiber 1, and pumping light is entered into the quasi rare earth-doped fiber 2 to multiplex with the signal light in the fused-stretch fiber portion 3 and absorb the pumping light in the rare earth-doped fiber 4, then emitting amplified signal light from the rare earth-doped fiber 4.

In the optical amplifier, the rare earth-doped fiber acts as an amplifying element, the fused-stretch fiber portion acts as a multiplexing element and the quasi rare earth-doped fiber acts as an entrance means of pumping light to be introduced to the multiplexing element. The fused-stretch fiber portion connects between on one side the rare earth-doped fiber and on the other side the quasi rare earth-doped fiber and a single mode fiber for a entrance fiber of input signal light.

The optical fiber coupler features a fused-stretch fiber portion as a multiplexing element which is composed of fused material of the rare earth-doped fiber with the quasi rare earth-doped fiber having a similar propagation constant to the rare earth-doped fiber.

Therefore, the fused-stretch fiber portion may readily be established to have the transmission property of the quasi rare earth-doped fiber in order to couple the pumping light to the fused-stretch fiber portion, then, improving low-noise amplifying characteristics and lowering the coupling loss.

Further, the use of the quasi rare earth-doped fiber can effectively reduce loss of pumping light therethrough since the fiber is undoped with rare earth elements absorbing the pumping light.

Thus, in this optical amplifier, the optical fiber coupler is formed with the rare earth-doped fiber 4 as an amplifier element so that there is no need for use of any splicing portion for connection of the optical fiber coupler to another rare earth-doped fiber. Also, the quasi rare earth-doped fiber can be directly jointed to a pumping light source without any splicing portion required. Accordingly, the optical amplifier of the invention can reduce the number of splicing portions which have conventionally brought light energy loss due to fused connections, resulting in total reduction of light transmission loss.

In the optical fiber coupler, the fused joint portion through which the input signal light is entered to the fused-stretch fiber portion is separated via another shortened rare earth-doped fiber from said fused-stretch fiber portion which the pumping light directly enters, allowing each portion to be adjusted to have the optimum mode field diameter individually, in fabricating the coupler, to lower joint loss of each light.

Conventionally, a single mode fiber for input signal light and another single mode fiber for pumping light have been jointed as a multiplexing element and the multiplexed wave light has been transmitted to the end of a rare earth-doped fiber to amplify the signal light. In fact, the optical fiber couplers have used an optical fiber complying with the wavelength for pumping light which fiber has been very different in mode field diameter from an optical fiber for transmitting the signal light, causing the input signal light to increase in joint loss. This conventional structure has disadvantages of the difficulty to control the coupling of the optimum mode field diameter complying with each different wavelength light at corresponding joint portion in jointing the fibers to reduce coupling loss for the input signal light.

On the contrary, in the invention, in the step of jointing by fusing the single mode fiber to the rare earth-doped fiber, the fused joint portion can be controlled in dimensions to minimize the loss of the input signal light passing therethrough, and thereafter, during formation of the fused-stretch fiber portion, its dimensions can be controlled to minimize the loss of the pumping light passing therethrough. This procedure in the invention may be effective to reduce the coupling loss of the pumping light and, particularly, the signal light.

In general, difference in mode field diameter between two optical fibers to be jointed such as a combination of a rare earth-doped fiber 4 and a single mode fiber 1 might produce coupling loss due to emission of light at the joint portion. A mode field diameter of input signal light in the single mode fiber is different from that of the same light in the rare earth-doped fiber.

Figure 3A:
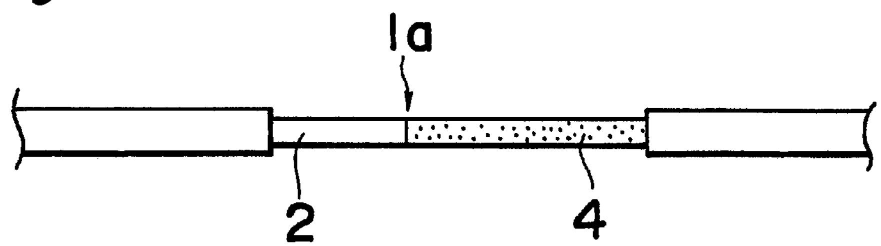
FIGS. 3A and 3B show optical fibers to explain a fabricating step for the optical fiber coupler according to an embodiment of the invention.
Figure 3B:
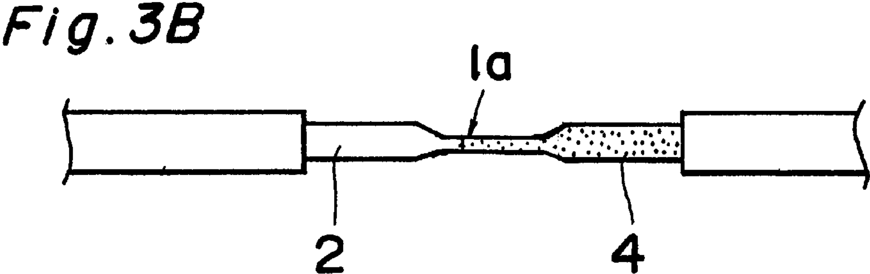

However, in this invention, by positioning the fused joint portion 1*a* adjacent the fused-stretch fiber portion, evanescent fields of the light in both fibers may be increased through the operation of stretching the fused-stretch fiber portion, then, lowering the relative size difference between the mode field diameters of these fibers. Particularly, as shown in FIGS. 3A and 3B, when the fibers in the vicinity of the fused joint portion 1*a* is stretched to make narrower a core of the fiber in which the light is closed, in FIG. 3B, evanescent fields of the light in both fibers may be increased, and then mode field diameters are increased in both single mode fiber and rare earth-doped fiber.

Figure 4:
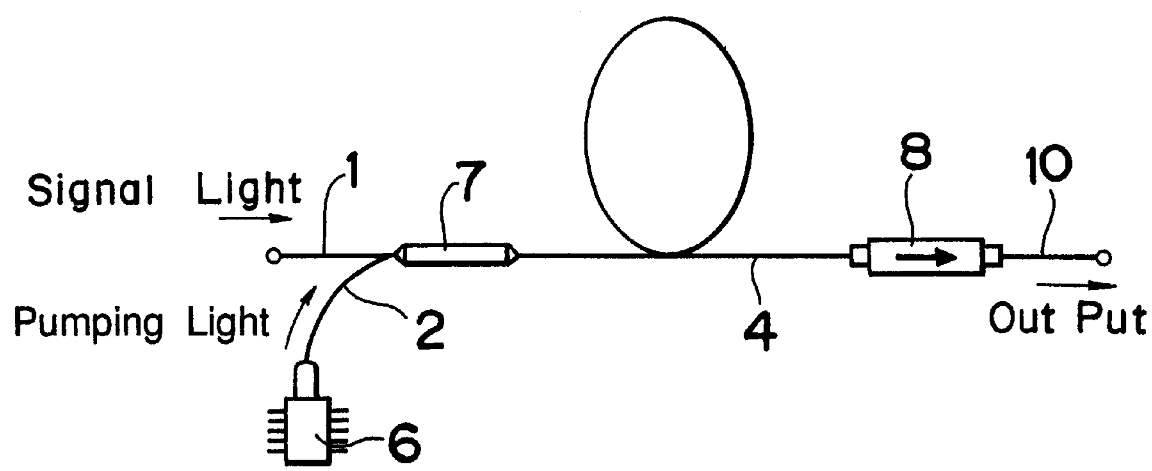
FIG. 4 shows an optical amplifier using an optical coupler according to an embodiment of the invention.

In an embodiment of the invention, FIG. 4 illustrates that the optical amplifier is composed of the optical fiber coupler 7, discussed above as a multiplexer, including a pumping light source 6 which is directly connected to the quasi rare earth-doped fiber 2 extended from the optical fiber coupler 7, and an inline optical isolator 8 which on its output side is connected to the rare earth-doped fiber 4, and on its output side to another single mode fiber 10.

Input signal light is entered via the single mode fiber 1 into the optical fiber coupler 7, and output signal light which is amplified in the rare earth-doped fiber 4 is output through the light isolator from said another single mode fiber 10.

Referring to FIGS. 1A and 4, the input signal light enters through the single mode fiber 1, penetrates through the fused joint portion 1*a* while being increasing its mode field diameter and proceeds through the shortened rare earth-doped fiber into the fused-stretch fiber portion 3. On the other hand, the pumping light supplied by a pumping light source 6 passes through the quasi rare earth-doped fiber 2 and enters the fused-stretch fiber portion and multiplexes with the input signal light there. In this case, only the input signal light component is entered into the shortened rare earth-doped fiber, and then the multiplexing of the signal light component with the pumping light component takes place in the fused-stretch fiber portion.

Therefore, it is possible to couple between the signal light and pumping light with the properly adapted mode field diameters at the fused-stretch fiber portion connecting the rare earth-doped fiber with the quasi rare earth-doped fiber in parallel with each other, resulting in lowered loss optical coupling. The pumping light emitted from the pumping light source can pass through the fused-stretch fiber portion where it is multiplexed with the signal light. Thereafter, the rare earth metal ions dispersed in the rare earth-doped fiber 4 are pumped up by the pumping light to form population inversion of the ions in said fiber 4, then amplifying the input signal light. The amplified signal light in the rare earth-doped fiber 4 transmitted into the isolator 8 from which only the forward component of the amplified light is extracted into output signal light.

Figure 5:
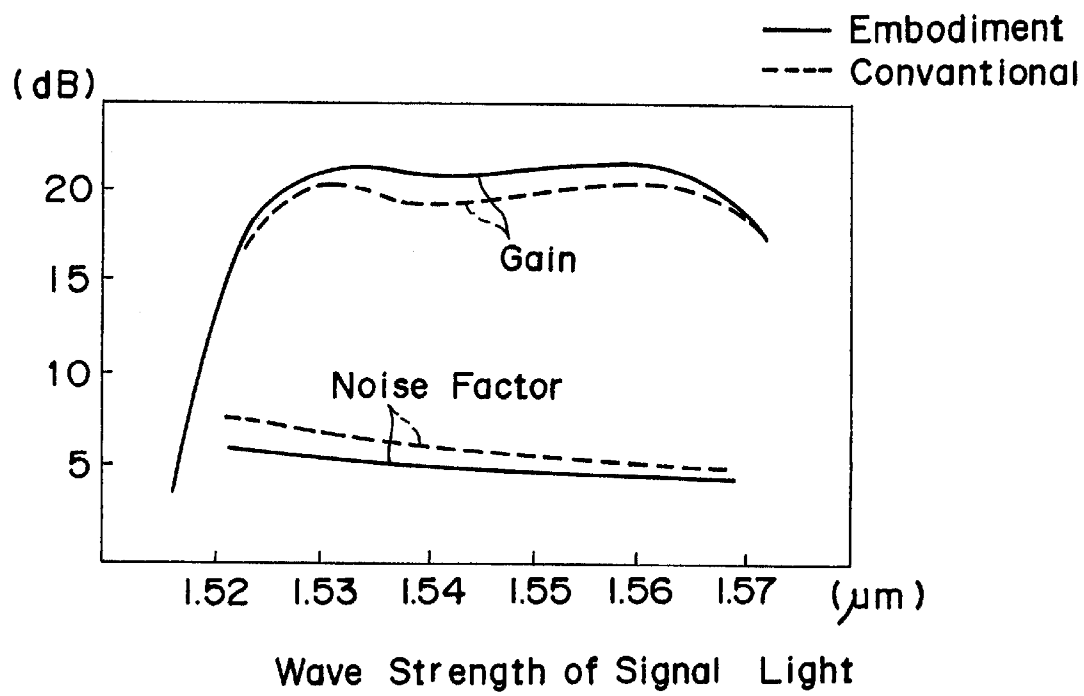
FIG. 5 shows a graph of amplification gain and noise characteristics of an amplifier according to an embodiment of the invention.
Figure 7:
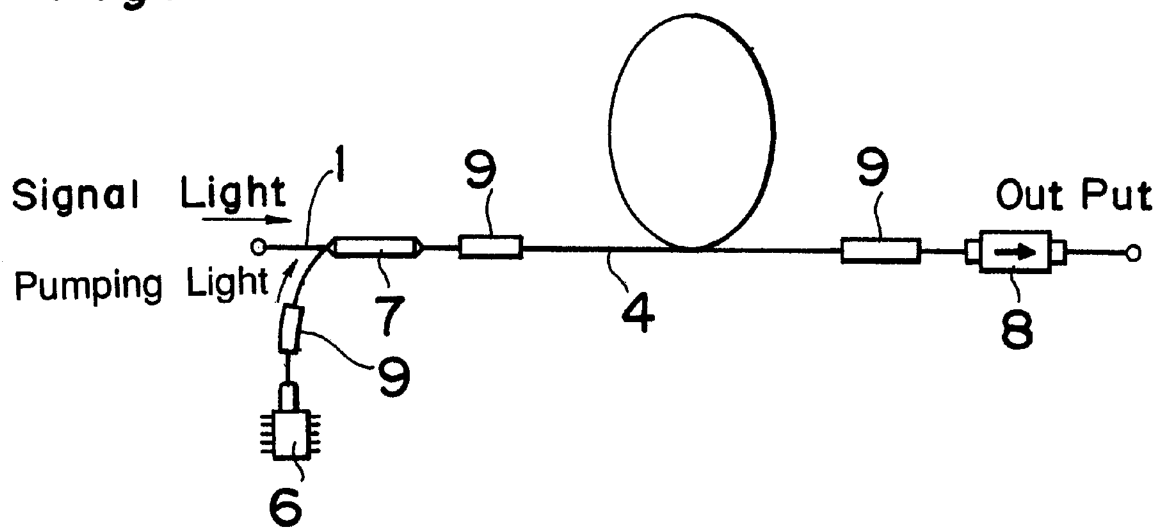
FIG. 7 shows a conventional optical amplifier.

FIG. 5 illustrates data of the amplifier of the invention compared to a conventional amplifier having three splicing portions in its optical circuit as in FIG. 7. Both examples used Er-doped silica-based fiber of almost the same length for an optical fiber amplifying element, but in this example of the embodiment, a quasi rare earth doped fiber was prepared by means of the similar process for fabricating the Er-doped fiber using silica-based fiber, the same glass materials, exception for no use of a step of doping Er to the core before cladding the core, and was used to fabricate a fused stretch fiber portion. The fused stretch fiber portion was formed of both Er-doped fiber and quasi rare earth doped fibers with a suitable length for a multiplexer.

It is found from these data of FIG. 5 that in the wavelength regions of active signal light of about 1.55 μm, the amplifier composed of the optical fiber coupler according to the present invention is superior in both gain and noise characteristics to the conventional amplifier.

The optical amplifier of this embodiment requires no splicing portions on both sides of the optical fiber coupler because the rare earth-doped fiber directly connects between said coupler 7 and isolator 8, and quasi rare earth-doped fiber 2 between the coupler 7 and the pumping light source 6, eliminating the need for at least two splicing portions as compared with the conventional amplifiers. Typically, joint loss of 0.1 to 0.2 dB occurs in one splicing portion between a rare earth-doped fiber and a single mode fiber, while total loss is maximum 0.4 dB by using two splicing portions. The optical amplifier of the invention can restrict the loss to the level of 0.1 dB or less by removing such a splicing potion and improve amplifying characteristics including signal gain and noise properties. Further, in fabricating the optical circuits for the optical amplifier from above optical elements, there is no need for splicing steps for fusing optical fibers, or for spaces in which to contain protecting tubes of the splicing portions.

In addition, while the above example shows the forward pumping technique for amplifying signal light, the present invention includes a backward pumping technique in which the pumping light is entered into a rear end of the rare earth-doped fiber as an amplifying element to the front end of which the fused-stretch fiber portion is connected. Another technique of bidirectional pumping may be adopted in which the both ends of the rare earth-doped fiber are incorporated with each optical fiber coupler which is connected to each separate pumping light source.

Figure 6:
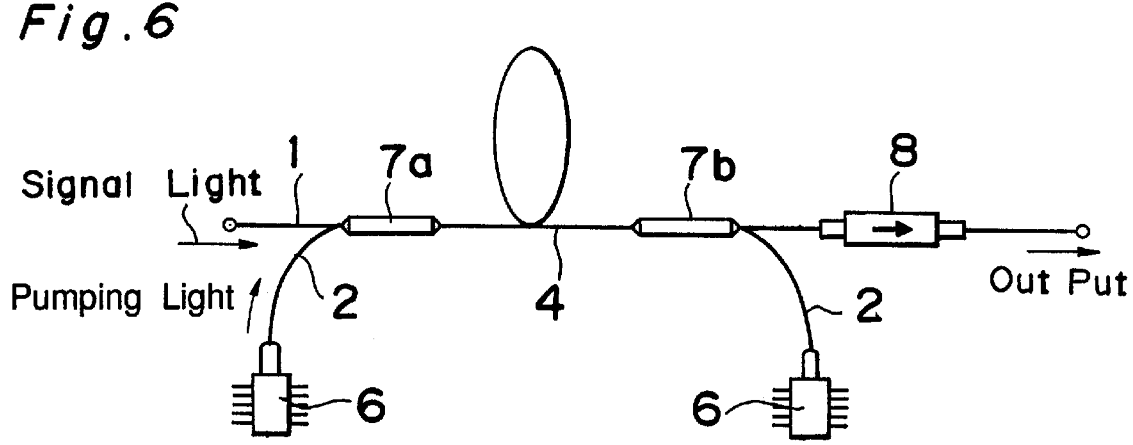
FIG. 6 shows an optical amplifier using two optical fiber couplers according another embodiment of the invention.

FIG. 6 shows an optical circuit of the bidirectional pumping method in which two multiplexers 7*a* and 7*b* composed of two optical fiber couplers of the invention are coupled to both ends of a rare earth-doped fiber 4 with one of the multiplexers 7*a* being connected to a single mode fiber for entrance of input signal light. The other of the multiplexers 7*b* is connected via another single mode fiber 1 to an inline type optical isolator 8, then, to output the amplified signal, by introducing each pumping light from the two pumping light sources 6 and 6 to both multiplexers 7*a* and 7*b*. The use of the two pumping light sources can effectively increase output power of the amplified signal from the optical amplifier.

What is claimed is:

1. An optical fiber coupler comprising: a rare earth-doped fiber; a quasi rare earth-doped fiber; a fused-stretch fiber portion as a multiplexing element which connects a part of the rare earth-doped fiber and a parts the quasi rare earth-doped fiber; and a single mode fiber which is jointed at a fused joint portion to the rare earth-doped fiber in the vicinity of the fused-stretch fiber portion.

2. The optical fiber coupler according to claim 1, wherein the quasi rare earth-doped fiber has substantially equal propagation constant to the rare earth-doped fiber without substantially containing rare earth elements.

3. The optical fiber coupler according to claim 1, wherein the joint portion of the single mode fiber is set to 30 mm or less in distance from the fused-stretch fiber portion.

4. The optical fiber coupler according to claim 1, wherein signal light enters the single mode fiber, pumping light enters the quasi rare earth-doped fiber to multiplexes with the signal light and an amplified light is output from the rare earth-doped fiber.

5. The optical fiber coupler according to claim 4, wherein a pumping light source is directly connected to the quasi rare earth-doped fiber.

6. The optical fiber coupler according to claim 1, wherein the common rare earth-doped fiber has the two optical fiber couplers, signal light enters the single mode fiber of one of the optical fiber couplers and pumping light from two pumping light sources enters both quasi rare earth-doped fibers of the optical fiber couplers, and an amplified light is extracted from the single mode fiber of the other optical fiber coupler.

7. A process of fabricating an optical fiber coupler, the process comprising:

jointing a single mode fiber with a rare earth-doped fiber by fusing abutted end faces of both fibers to form a combined fiber; and fusing parallel contact parts of a quasi rare earth-doped fiber and of the rare earth-doped fiber of the combined fiber and then elongating the fused parts in a desired diameter to form a fused-stretch fiber portion.

* * * * *